United States Patent
Noda et al.

(10) Patent No.: US 6,836,038 B2
(45) Date of Patent: Dec. 28, 2004

(54) MOTOR HAVING GROUNDING STRUCTURE FOR REDUCING RADIO NOISE

(75) Inventors: Takeo Noda, Hamana-gun (JP); Akihiko Suzuki, Toyohashi (JP)

(73) Assignee: ASMO Co., Ltd., Shizuoka (JP)

( * ) Notice: Subject to any disclaimer, the term of this patent is extended or adjusted under 35 U.S.C. 154(b) by 183 days.

(21) Appl. No.: 10/355,033

(22) Filed: Jan. 31, 2003

(65) Prior Publication Data

US 2003/0151318 A1 Aug. 14, 2003

(30) Foreign Application Priority Data

Feb. 12, 2002 (JP) ........................................ 2002-033691

(51) Int. Cl.[7] .......................... H02K 11/02; H02K 5/22
(52) U.S. Cl. ........................ 310/71; 310/89; 439/926
(58) Field of Search ...................... 310/71, 89, 40 MM; 439/248, 384, 557, 926

(56) References Cited

U.S. PATENT DOCUMENTS

| | | | | |
|---|---|---|---|---|
| 3,440,592 A | * | 4/1969 | Zelle ........................... | 439/108 |
| 5,343,102 A | * | 8/1994 | Mabuchi et al. .............. | 310/71 |
| 5,729,505 A | | 3/1998 | Murata et al. ............... | 336/178 |
| 5,861,689 A | * | 1/1999 | Snider et al. ................. | 310/71 |
| 6,285,106 B1 | | 9/2001 | Oki ............................. | 310/233 |
| 6,431,026 B1 | * | 8/2002 | Walther et al. ............ | 74/606 R |

FOREIGN PATENT DOCUMENTS

| | | | | |
|---|---|---|---|---|
| JP | | 55131245 A | * 10/1980 | ............ H02K/5/22 |
| JP | | A-10-174357 | 6/1998 | |
| JP | | A-2001-8414 | 1/2001 | |

* cited by examiner

Primary Examiner—Burton Mullins
(74) Attorney, Agent, or Firm—Posz & Bethards, PLC

(57) ABSTRACT

A motor includes a substantially cylinder-shaped motor yoke with an opening at one end, an end plate, and DC power input terminals. The end plate is positioned adjacent to the opening of the motor yoke, and the DC power input terminals are fixed to the end plate. The motor yoke has a grounding flange that protrudes from an outer periphery of the motor yoke adjacent to the opening. A negative terminal of the DC power input terminals has an elastic contact segment. The contact segment is pressed against the grounding flange to ground the motor yoke.

9 Claims, 4 Drawing Sheets

MOTOR HAVING GROUNDING STRUCTURE FOR REDUCING RADIO NOISE

CROSS REFERENCE TO RELATED APPLICATION

This application is based on and incorporates herein by reference Japanese Patent Application No. 2002-033691 filed on Feb. 12, 2002.

FIELD OF THE INVENTION

The present invention relates to a motor having a grounding structure for reducing radio noise that appears at a motor yoke.

BACKGROUND OF THE INVENTION

In a direct current (DC) motor having a brush, radio noise is produced by friction between the brush and a commutator when the motor is in operation. The radio noise that appears at a yoke of the motor may affect to peripheral devices. To reduce the radio noise, the motor yoke needs to be grounded. Therefore, such a motor includes a terminal made of a conductive elastic material between the motor yoke and an end plate that is arranged adjacent to an opening of the motor yoke. To ground the motor yoke, the terminal is connected to a negative terminal of a power supply or the negative terminal is inserted between the motor yoke and the end plate.

Since the terminal is added, an overall parts cost of the motor increases. Moreover, the connection between the motor yoke and the end plate becomes loose when an external force is applied to the motor or vibration is produced in the motor. If the negative terminal is inserted between the motor yoke and the end plate, the electrical connection between the negative terminal and the motor yoke may become loose.

SUMMARY OF THE INVENTION

The present invention therefore has an objective to provide a motor having a grounding structure for reducing radio noise that appears at a motor yoke without any increase in parts cost. A motor of the present invention includes a substantially cylinder-shaped motor yoke, an end plate provided adjacent to an opening of the motor yoke, and a DC power input fixed to the end plate. The motor yoke has a flange at its opening end. The flange protrudes outward and has a contact with a part of a negative terminal of the DC power input section.

In this motor, the motor yoke is grounded via the negative terminal, that is, an additional part is required for grounding the motor yoke. Therefore, the radio noise that appears at the motor yoke is reduced without an increase in parts cost. Moreover, the negative terminal is directly connected to the motor yoke. This maintains the contact resistance between the negative terminal and the motor yoke at low level. Therefore, the radio noise that appears at the motor yoke is constantly reduced.

The negative terminal has an elastic contact segment that protrudes toward the flange. The elastic contact segment is pressed against the flange. Therefore, the contact between the negative terminal and the motor yoke is maintained even when the connection between the motor yoke and the end plate becomes loose.

BRIEF DESCRIPTION OF THE DRAWINGS

The above and other objectives, features and advantages of the present invention will become more apparent from the following detailed description made with reference to the accompanying drawings. In the drawings.

DETAILED DESCRIPTION OF THE PREFERRED EMBODIMENT

Figure 1:
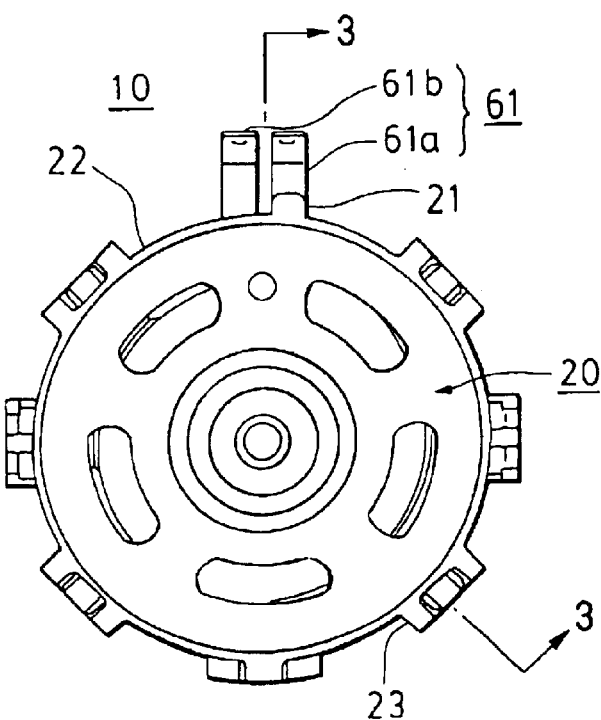
FIG. 1 is a rear view of a motor according to the first embodiment of the present invention.

The preferred embodiments of the present invention will be explained with reference to the accompanying drawings. In the drawings, the same numerals are used for the same components and devices.

First Embodiment

Figure 2:
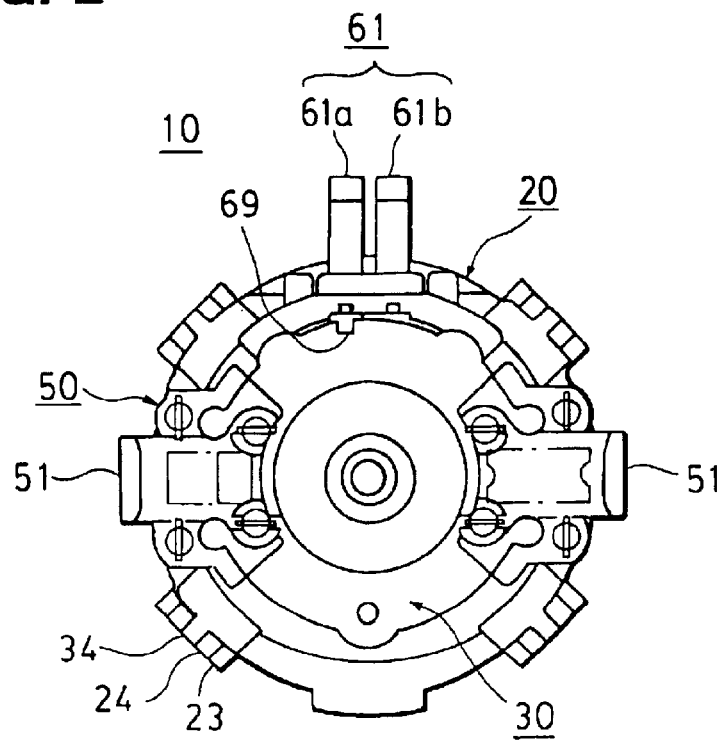
FIG. 2 is a front view of the motor.
Figure 3:
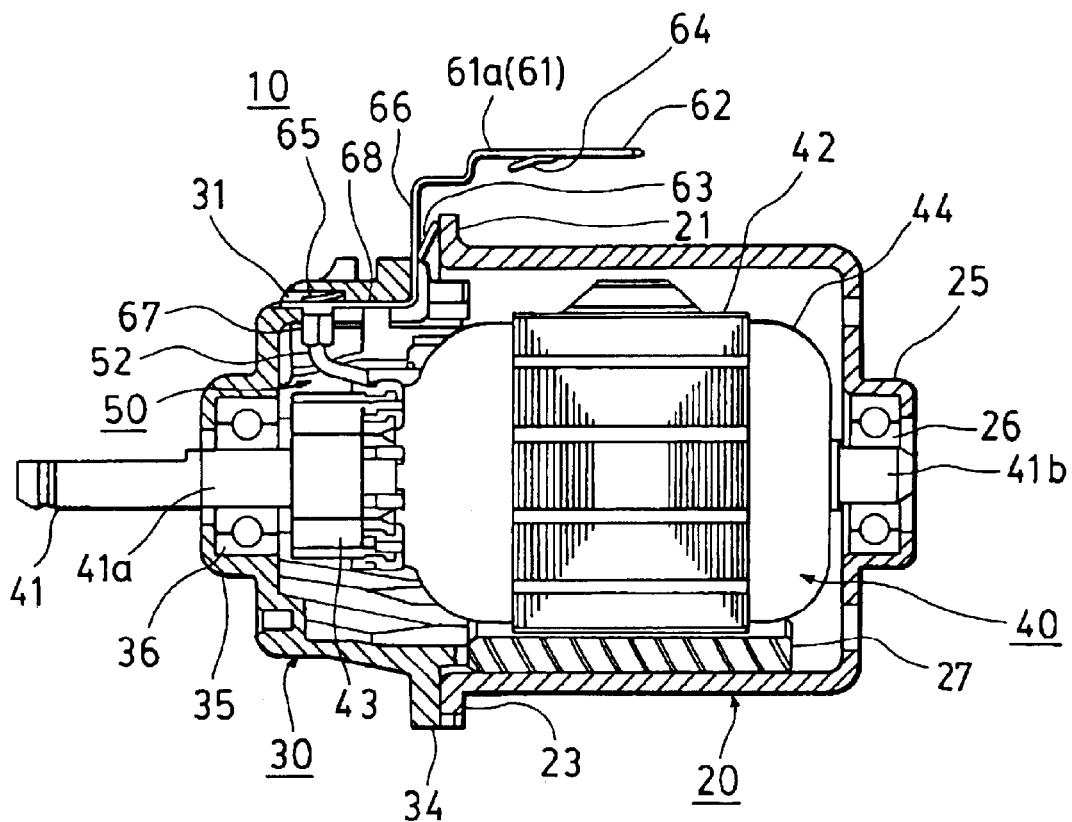
FIG. 3 is a cross-sectional view of the motor taken along line A—A of FIG. 1.
Figure 4:
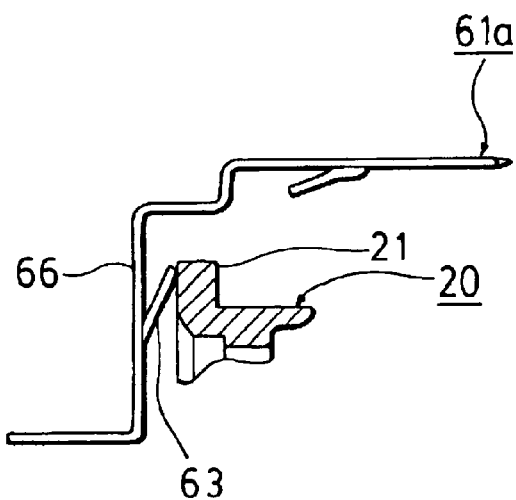
FIG. 4 is an enlarged view of the motor showing a connection between a negative terminal and a motor yoke.
Figure 5:
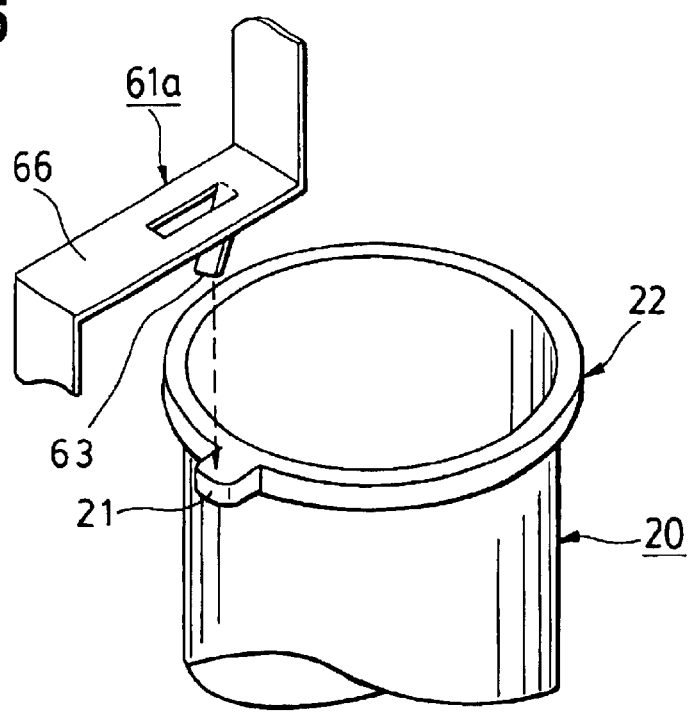
FIG. 5 is an enlarged perspective view of the motor showing a connection between the negative terminal and the motor yoke.

Referring to FIGS. 1 through 3, a motor 10 includes a motor yoke 20, an end plate 30, an armature 40, and a brush device 50. The motor 10 is used for an onboard air blower. The motor yoke 20 is formed in a substantially cylinder shape with one end closed for housing the armature 40. The closed end of the motor yoke 20 has a bearing housing portion 25 that is in a form of a well. The bearing housing portion 25 houses a ball bearing 26. Stators 27 made of magnets with a substantially fan-shaped cross-section are arranged on an inner periphery of the motor yoke 20 at regular interval in the circumferential direction.

A flange 22 is formed adjacent to the opening of the motor yoke 20 along its rim, and referred to as a rim flange 22. A grounding flange 21 is formed in a specific portion of the rim flange 22. The grounding flange 21 further protrudes outward from the rim flange 22 and electrically connects the motor yoke 20 and a negative terminal 61a.

Referring to FIG. 2, the rim flange 22 has protrusions 23 roughly at regular intervals in a specified area of the outer periphery of the rim flange 22. Each protrusion 23 has a split claw 24, the tip of which is split into two branches. When the motor yoke 20 and the end plate 30 are engaged for assembly, connecting protrusions 34 of an end plate 30 are pinched between the branches.

The end plate 30 is provided in a cap shape as shown in FIG. 3 for housing a brush device 50. The end plate 30 has a terminal housing portion 31 at its outer periphery for housing a DC power input terminal 61 fixed to the brush device 50. The terminal housing portion 31 has a slit formed parallel to a rotary shaft 41. The connecting protrusions 34 are arranged on the outer periphery of the end plate 30 adjacent to its opening.

An armature 40 includes the rotor shaft 41, a core 42, a commutator 43, and a coil 44. The core 42 is constructed of thin metal plates stacked in multilayer and fixed in the middle portion of the rotor shaft 41. The commutator 43 is positioned adjacent to the brush device 50 on the rotor shaft 41. The coil 44 is wound round the core at a predefined position and electrically connected to the commutator 43. The commutator 43 rubs against brushes (not shown) held by the brush device 50, and commutates current generated by the brushes to the coil 44.

The rotor shaft 41 includes bearing portions 41a and 41b that are supported by bearings 36 and 26, respectively. The bearing portion 41a is provided in appropriate size for fitting the bearing 36, and housed in the end plate 30. The bearing portion 41b is provided in appropriate size for bearing 26 for fitting the bearing 26, and housed in the motor yoke 20. The 41a and 41b are supported by the bearings 36 and 26, respectively. The bearing 36 is housed in the bearing housing portion 35 of the end plate 30.

The brush device 50 includes the brushes, brush boxes 51, pigtail 52, and a DC power input terminal 61. The brush device 50 is arranged in the middle portion of the end plate 30. Each brush box 51 is positioned so that its centerline matches the radial direction of the end plate 30. The brushes are supported by the brush boxes 51

A DC power input terminals 61 includes a negative terminal 61a and a positive terminal 61b that are made of thin metal conductive plates formed in a predetermined shape. The negative terminal 61a has a connecting portion 62, a flat portion 66, and a supported portion 68. The connecting portion 62 is positioned in the axial direction of the motor yoke 20 and formed so that it can be inserted into an external connector (not shown). The flat portion 66 is arranged perpendicular to the connecting portion 62, that is, in the radial direction of the motor yoke 20. The supported portion 68 is arranged perpendicular to the flat portion 66, that is, in the axial direction of the end plate 30.

The connecting portion 62 has a locking segment 64 that protrudes toward the center of the motor yoke 20 for securing the negative terminal 61a in the external connector. The supported portion 68 has a locking segment 65 that protrudes toward the outer periphery of the end plate 30 for securing the negative terminal 61a in the terminal housing portion 31. The supported portion 68 also has a crimping segment 67 that is bent toward the center of the end plate 30.

The flat portion 66 has an elastic contact segment 63 that is formed by punching out a part of the flat portion and bending it toward the grounding flange 21. The contact segment 63 extends outwardly in the radial direction of the motor yoke 20. The elastic contact segment 63 grounds the motor yoke 20 when it contacts the grounding flange 21.

When the motor yoke 20 and the end plate 30 are assembled, a force that binds them together is applied to the flat portion 66 in the orthogonal direction. Therefore, the pressure that the elastic contact segment 63 applies to the grounding flange 21 increase, that is, the connection between the contact segment 63 and the flange 21 improves. Furthermore, forces and vibrations applied to the motor yoke 20, the end plate 30, and the flat portion 66 can be reduced by the elastic contact segment 63.

Since the contact segment 63 extends outwardly, it will not stick out to the inner space of the motor yoke 20 even when it is pressed against the motor yoke 20. This decreases chances that the contact segment 63 touches components of the motor 10, including an armature 40.

The positive terminal 61b has the same configuration as the negative terminal 61a. However, the flat portion of the positive terminal 61b does not have a contact segment, such as the elastic contact segment 63. The negative terminal 61a and the positive terminal 61b are inserted into the terminal housing portion 31 from the opening of the end plate 30. The locking segments 64 and 65 engage in catch portions, respectively, and the terminals 61a and 61b are fixed to the end plate 30.

The crimping segment 67 of the negative terminal 61a is connected to a pigtail 52 that is connected to the negative-side brush. The crimping segment (not shown) of the positive terminal 61b is connected to a pigtail (not shown) that is connected to the positive-side brush (not shown). The motor yoke 20 and the end plate 30 are assembled together with the positive terminal 61a and the negative terminal 61b fixed to the end plate 30. As a result, the elastic contact segment 63 is pressed against the grounding flange 21 and the motor yoke 20 is electrically connected to the negative terminal 61a.

Since the motor yoke 20 is grounded via the negative terminal 61a, additional parts, such as a terminal, for grounding are not required. Therefore, radio noise that appears at the motor yoke 20 is constantly reduced at low cost. The negative terminal 61a has direct contact with the motor yoke 20. Thus, contact resistance between them can be maintained at low level and the radio noise that appears at the motor yoke 20 is constantly reduced. The elastic contact segment 63 is pressed against the grounding flange 21. Therefore, the negative terminal 61a maintains the contact with the motor yoke 20 even when the connection between the motor yoke 20 and the end plate 30 becomes loose.

When the motor 10 is installed on a vehicle (not shown), the terminals 61a and 61b are connected to a negative terminal and a positive terminal of a vehicular power supply device with proper harnesses, respectively. The negative terminal of the power supply device is connected to a chassis ground via brackets and harnesses.

To start the motor 10, a predetermined voltage is applied between the negative terminal 61a and the positive terminal 61b from the vehicular power supply device. When the motor starts operating, current starts flowing between the brushes and the coil 44 and the stators 27 are energized. As a result, the armature 40 starts rotating. When the motor 10 is in operation, radio noise is generated by fraction between the brushes and the commentator 43. However, the radio noise is reduced since the motor yoke 20 is connected to the chassis ground via the negative terminal 61a. Moreover, the negative terminal 61a can maintain the contact with the motor yoke 20 since the elastic contact segment 63 is pressed against the grounding flange 21.

Alternatively, the negative terminal 61a can be constructed without the contact segment 63. In this case, the flat portion 66 directly contacts the grounding flange 21. An entire surface of the grounding flange 21 has contact with the negative terminal 61a, that is, the contact area increases. Therefore, the contact resistance between the negative terminal 61a and the motor yoke 20 maintains low and the radio noise that appears at the motor yoke 20 is constantly reduced.

Second Embodiment

Figure 6:
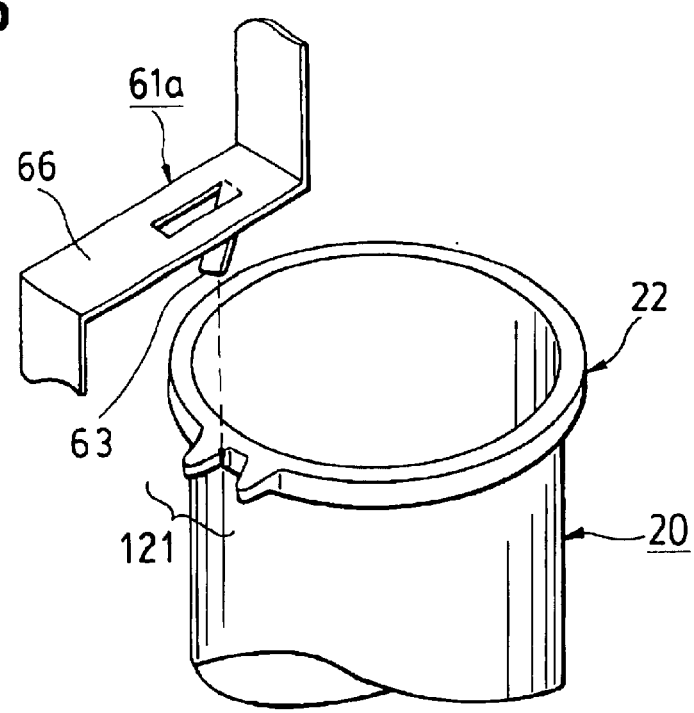
FIG. 6 is an enlarged perspective view of a motor according to the second embodiment of the present invention showing a connection between a negative terminal and a motor yoke.

Referring to FIG. 6, the rim flange 22 of the motor yoke 20 has a grounding flange that includes a branch portion 121. The contact segment 63 is crimped in the branch portion 121 for grounding the motor yoke 20. With this configuration, the contact segment 63 tightly connected with the motor yoke 20. Therefore, the negative terminal 61a can maintain the contact with the motor yoke 20 even when the connection between the motor yoke 20 and the end plate 30 becomes loose. That is, the radio noise that appears at the motor yoke 20 is constantly reduced.

Third Embodiment

Figure 7:
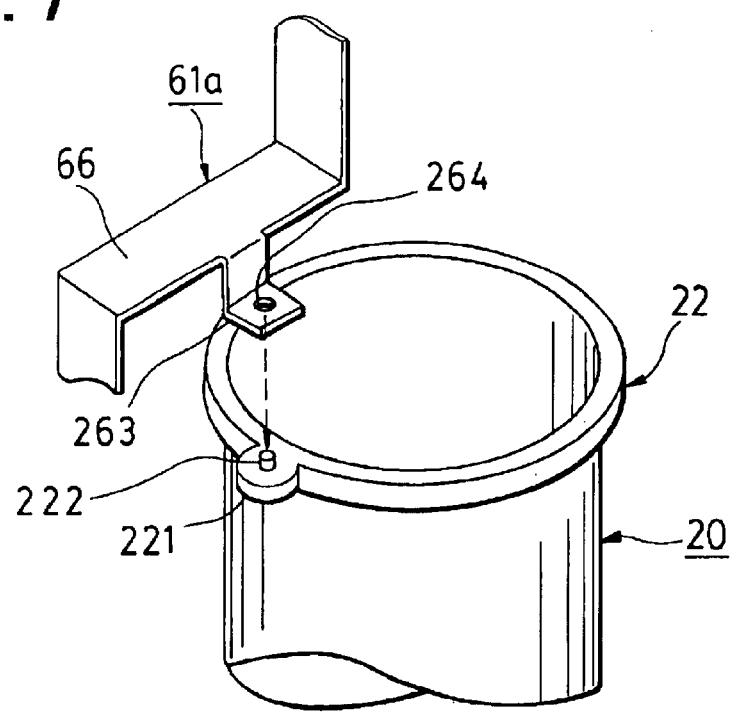
FIG. 7 is an enlarged perspective view of a motor according to the third embodiment of the present invention showing a connection between a negative terminal and a motor yoke.

Referring to FIG. 7, the rim flange 22 of the motor yoke 20 has a grounding flange 221 that is in substantially disk shape. In the center of the grounding flange 221, a boss 222 is provided parallel to the axis of the motor yoke 20. A contact segment 263 that protrudes form the flat portion 66 of the negative terminal 61a is provided instead of the contact segment 63. The contact segment 263 is bent toward the motor yoke 20 and its free end is bent so that the surface of the free end is substantially parallel to the surface of the grounding flange 221.

The free end has a boss hole 264 at its center. The boss 222 is fit into the boss hole 264 for engaging the negative terminal 61a with the motor yoke 20. When the boss 222 is fit into the boss hole 264, the motor yoke 20 is grounded. The entire surface of the bent free end of the contact segment 263 is pressed against the grounding segment 221. Therefore, the negative terminal 61a can maintain the contact with the motor yoke 20 even when the connection between the motor yoke 20 and the end plate 30 becomes loose. That is, the radio noise that appears at the motor yoke 20 is constantly reduced.

The boss 222 can be provided at the contact segment 263. In this case, the boss hole 264 is formed in the center of the grounding segment 221. Although it is preferable to press fit the boss 222 into the boss hole 264, the free end of the boss 222 may be squashed for tight fit. Alternatively, the free end of the boss 222 may be split in the opposite directions after it is inserted into the boss hole 264.

Fourth Embodiment

Figure 8:
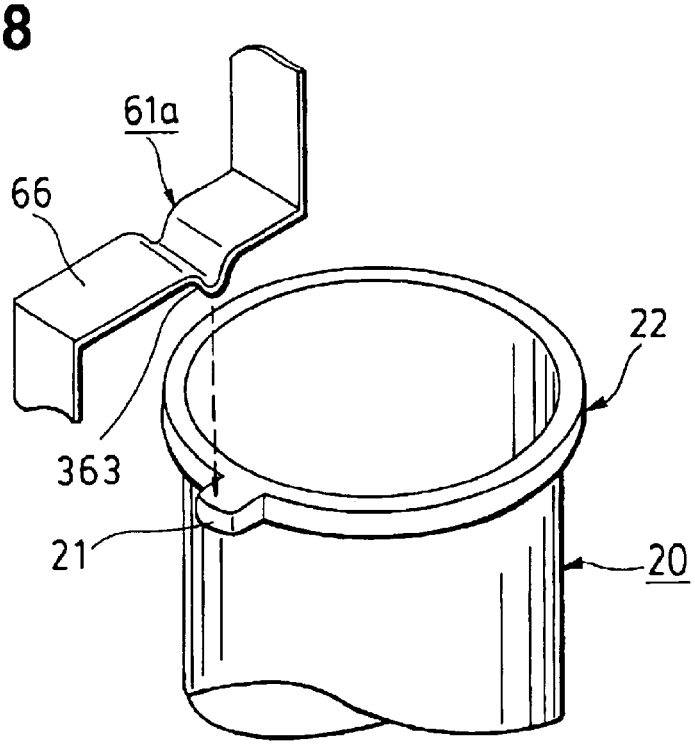
FIG. 8 is an enlarged perspective view of a motor according to the fourth embodiment of the present invention showing a connection between a negative terminal and a motor yoke.

Referring to FIG. 8, the flat portion 66 of the negative terminal 61a has a dent 363 that is dented toward the motor yoke 20. When the dent 363 is pressed against the grounding flange 21, the motor yoke 20 is grounded. With this configuration, the negative terminal 61a can maintain the contact with the motor yoke 20 even when the connection between the motor yoke 20 and the end plate 30 becomes loose. Therefore, the radio noise that appears at the motor yoke 20 is constantly reduced.

The present invention should not be limited to the embodiment previously discussed and shown in the figures, but may be implemented in various ways without departing from the spirit of the invention. For example, the grounding flange 21 may be provided along the entire rim flange 22. The elastic contact segment 63 can be arranged in the connecting portion 62, or the supported portion 68. The contact segment 63 can be arranged differently as long as it has contact with a part of the grounding flange 21.

The present invention can be applied to other types of DC motors, such as a DC brushless motor. The brush device 50 may include an electrical circuit that is connected to the negative terminal 61a. The electrical circuit may include a circuit breaker, a diode for circuit protection, a choke coil, a diode, a capacitor, and a varister for noise reduction.

If aluminum is used for the end plate 30, it is desirable to ground the end plate 30 via the negative terminal 61a. This reduces radio noise that appears at the end plate 30. Therefore, overall radio noise in the motor is reduced.

What is claimed is:

1. A motor comprising:

a motor yoke formed in substantially cylinder shape with an opening at one end and a flange that protrudes outward at a position adjacent to the opening;

an end plate fixed to the motor yoke over the opening;

a direct current power input device included in the end plate; and a negative terminal connected to the direct current power input device, wherein the flange of the motor yoke is in contact with at least a part of the negative terminal to ground the motor yoke.

2. The motor according to claim 1, wherein:

the part of the negative terminal, which is in contact with the flange, is formed in an elastic contact segment that protrudes toward the flange; and the contact segment is pressed against the flange.

3. The motor according to claim 2, wherein the elastic contact segment extends outwardly in the radial direction of the motor yoke.

4. The motor according to claim 1, wherein:

the motor yoke and the end plate are bound together;

the negative terminal is sandwiched between the motor yoke and the end plate at a part including the elastic contact segment;

the part of the negative terminal, which is in contact with the flange, is pressed against the motor yoke with a binding force that binds the motor yoke and the end plate together.

5. The motor according to claim 1, wherein:

the part of the negative terminal, which is in contact with the flange, is formed in an elastic contact segment that protrudes toward the flange;

the flange has a branch portion; and the contact segment is engaged in the branch portion.

6. The motor according to claim 1, wherein:

the part of the negative terminal, which is in contact with the flange, protrudes toward the flange and has a hole; and the flange has a protrusion that fits in the hole of the negative terminal.

7. The motor according to claim 1, wherein:

the part of the negative terminal, which is in contact with the flange, protrudes toward the flange and has a protrusion that further protrudes toward the flange; and the flange has a hole in which the protrusion of the negative terminal fits.

8. The motor according to claim 1, wherein:

the part of the negative terminal, which is in contact with the flange, has a dent that is dented toward the flange; and the negative terminal is pressed against the flange with the dent positioned against the flange.

9. The motor according to claim 8, wherein the part of the negative terminal, which is in contact with the flange, extends outwardly in the radial direction of the motor yoke.

* * * * *